(12) United States Patent  (10) Patent No.: US 7,543,892 B2
Minakawa et al.  (45) Date of Patent: Jun. 9, 2009

(54) SEAT BACK OF AUTOMOTIVE SEAT WITH BACK BOARD

(75) Inventors: Takamasa Minakawa, Akishima (JP); Atsushi Kunizawa, Akishima (JP)

(73) Assignee: Tachi-S Co., Ltd, Tokyo (JP)

( * ) Notice: Subject to any disclaimer, the term of this patent is extended or adjusted under 35 U.S.C. 154(b) by 212 days.

(21) Appl. No.: 11/641,858

(22) Filed: Dec. 20, 2006

(65) Prior Publication Data

US 2008/0150343 A1  Jun. 26, 2008

(51) Int. Cl.
    *A47C 7/02* (2006.01)
(52) U.S. Cl. ............. 297/452.18; 297/452.23; 297/452.33
(58) Field of Classification Search ........ 297/452.18, 297/452.23, 452.33, 217.1, 217.4
    See application file for complete search history.

(56) References Cited

U.S. PATENT DOCUMENTS

| 4,747,638 | A | * | 5/1988 | Saito | 297/452.62 |
| 5,193,881 | A | * | 3/1993 | Minai | 297/452.18 |
| 5,368,368 | A | * | 11/1994 | Fukui et al. | 297/452.18 |
| 6,817,675 | B2 | * | 11/2004 | Buss et al. | 297/452.6 |
| 7,159,938 | B1 | * | 1/2007 | Shiraishi | 297/217.4 |
| 7,222,915 | B2 | * | 5/2007 | Philippot et al. | 297/216.13 |
| 7,413,248 | B2 | * | 8/2008 | Matsuhashi | 297/217.4 |

FOREIGN PATENT DOCUMENTS

JP  2003-189975  7/2003

* cited by examiner

*Primary Examiner*—David Dunn
*Assistant Examiner*—Erika Garrett
(74) *Attorney, Agent, or Firm*—Browdy and Neimark, P.L.L.C.

(57) ABSTRACT

A back board having a main wall region and two lateral wall regions is securely attached to a rear side of a seat back. In such combination of seat back and back board, two presser elements, fixed to the rear side of seat back, are respectively in pressing contact with: one pressure receiving belt element extended between the main wall region of the back board and one of the two lateral wall regions of the back board; and another pressure receiving belt element extended between the main wall region of back board and another of the two lateral wall regions of back board. Thus, those two lateral wall regions of back board are resiliently bent or curved inwardly of the back board to close contact with respective two lateral sides of the seat back. The back board can be formed from a thin elastic material for light-weight purpose.

4 Claims, 3 Drawing Sheets

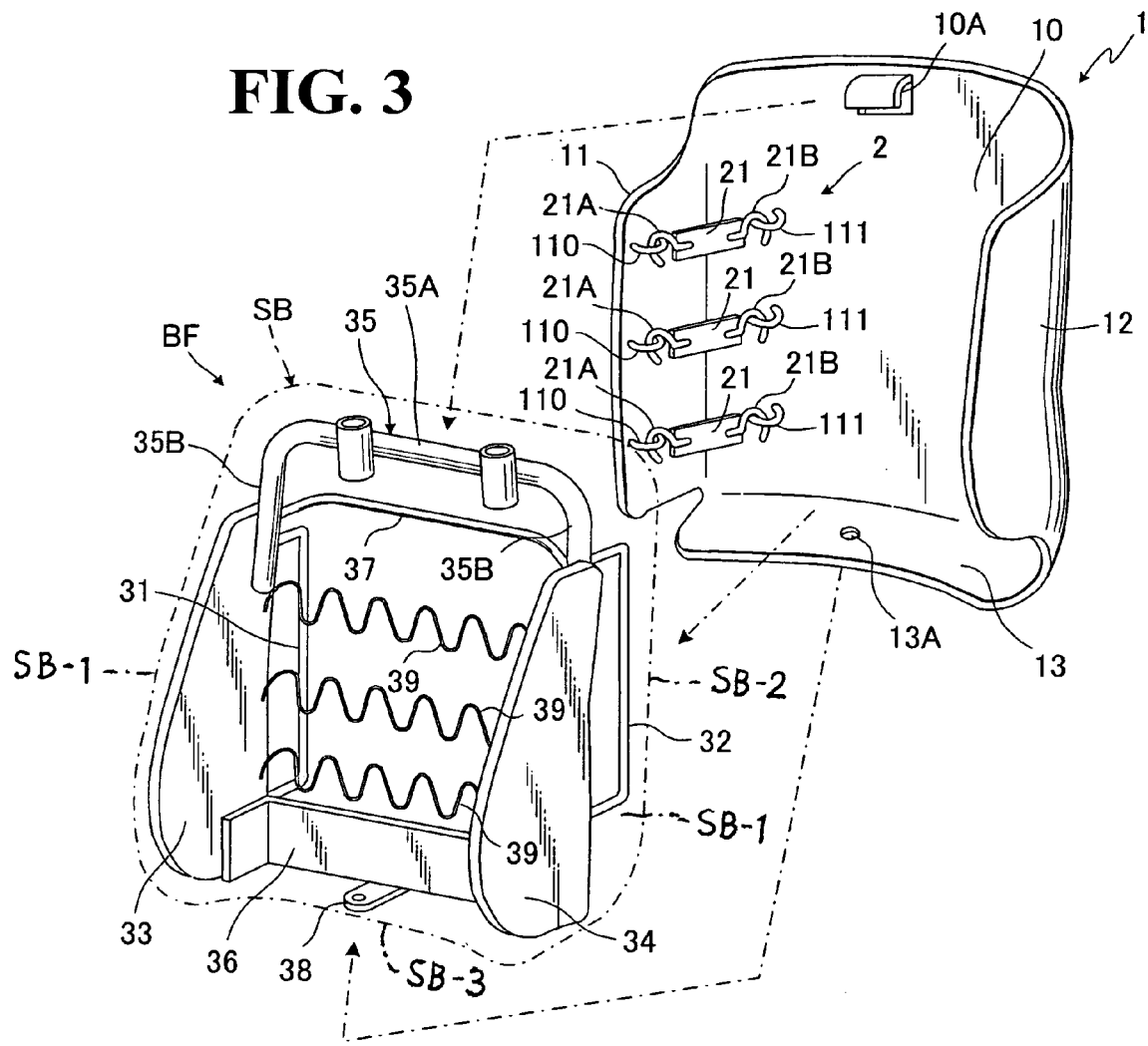
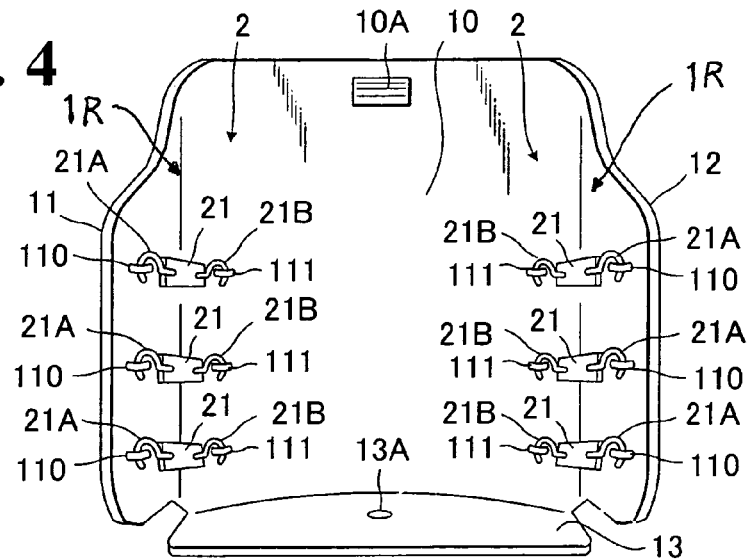

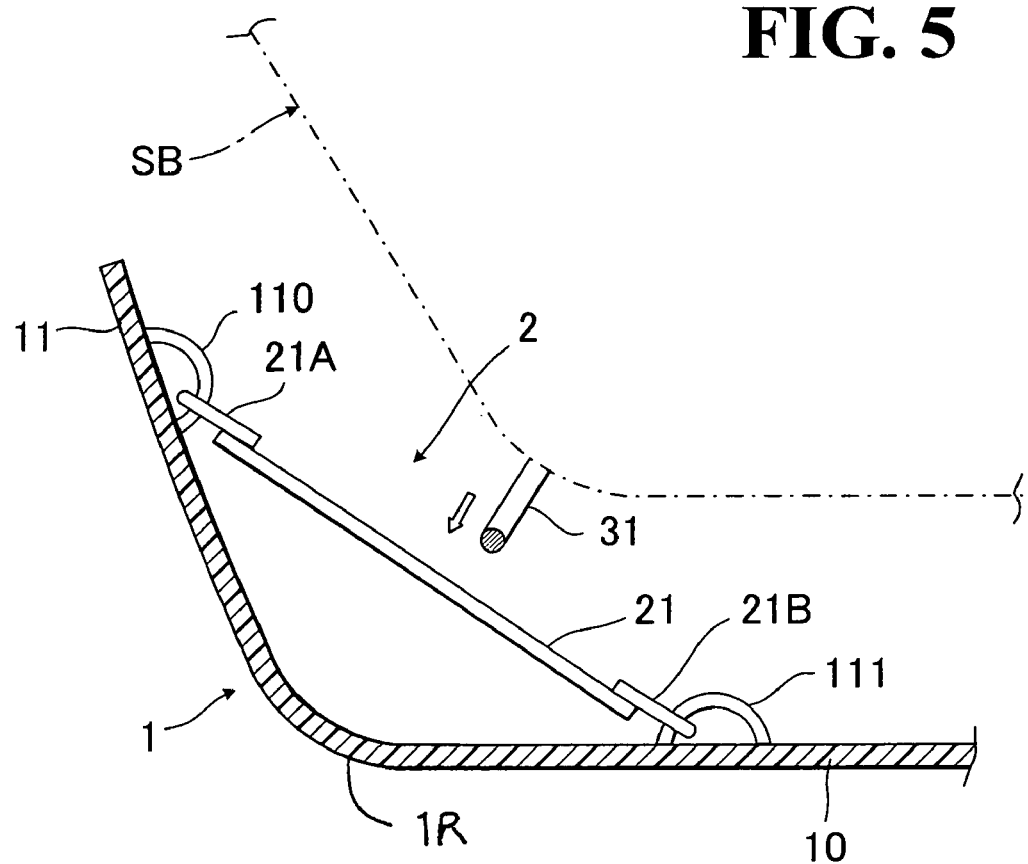
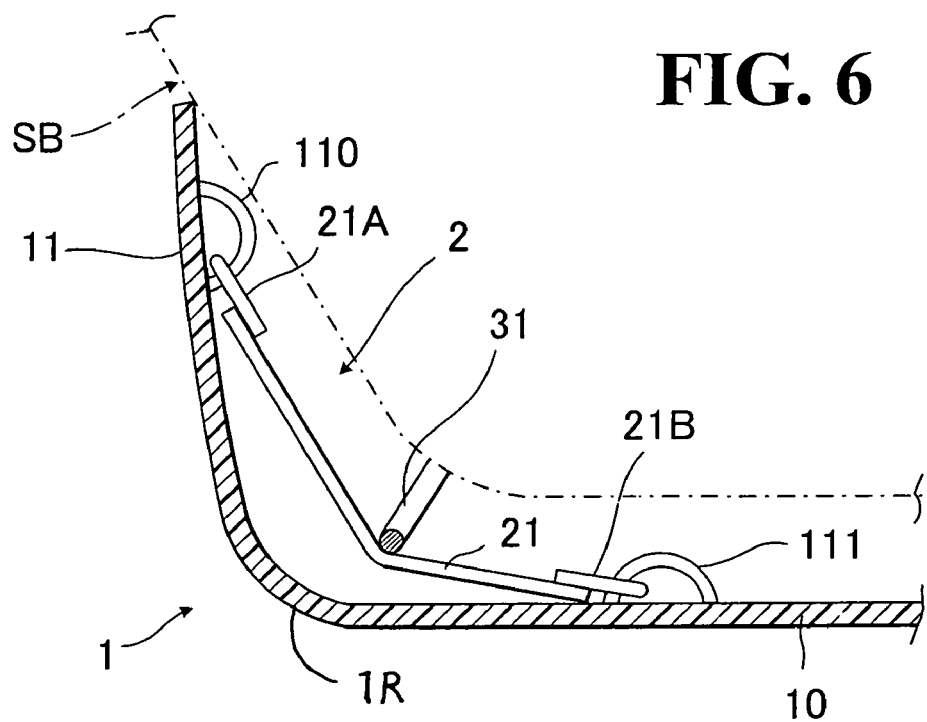

SEAT BACK OF AUTOMOTIVE SEAT WITH BACK BOARD

BACKGROUND OF THE INVENTION

1. Field of the Invention

The present invention relates to a seat back of an automotive seat. In particular, the invention is directed to a combination of the seat back and a back board securely attached to that particular seat back.

2. Description of Prior Art

Generally stated in the filed of automotive seats, a back board for attachment to a rear side of a seat back is formed from a resin material, a hard board, a molded paper material, or the like. Normally, this sort of back board is formed to have an increased thickness by using one of those materials with a view to providing a structural rigidity and also the back board itself to be in a close contact with the contour of seat back. But, when it came to attaining a light weight of seat back for fuel economy purpose, it is required to reduce the thickness of the back board, in which case, the rigidity of the back board will become decreased, with the result that, when a backward load is applied to the seat back, a padding in the seat back is thereby pressed against the back board which is eventually deformed or damaged. Further, the reduced thickness of back board is insufficient to cause close contact of outer surfaces of the seat back with inward surfaces of the back board, so that some clearances are found between the back board and the areas of the seat back with which that particular back board is to be contacted, which results in impairing an outer aesthetic appearance of the seat back.

The Japanese Laid-Open Patent Publication No. 2003-189973 teaches a back board for seat back, wherein steel angle elements and the like are attached to and along inward corner portions of a relatively thin back board, thereby not only providing reinforcement to the back board sufficient to withstand a backward load applied thereto via a padding of the seat back, but also causing inner surfaces of the back board to be in close contact with the contour of rearward portions of the seat back.

However, at any rate, a heavy weight of the steel angle elements adversely increases a weight of the back board, resulting in an increased weight of seat back on the whole, and costs involved in forming and securing such steel angle elements to the back board are rather expensive.

SUMMARY OF THE INVENTION

In view of the above-stated drawbacks, it is a purpose of the present invention to provide a novel combination of a seat back of automotive seat and a back board securely attached to that particular seat back, which permits for reducing a weight of the back board for effective fuel economy purpose and also permits for preventing creation of clearances between the seat back and back board.

In order to achieve such purpose, in accordance with the present invention, there is basically provided a combination of a seat back of automotive seat and a back board, wherein the seat back has a rear side disposed rearwardly thereof and a pair of lateral sides, and also includes, provided therein, a seat back framework and a foam padding, such that the foam padding is disposed at a side of the seat back framework which faces forwardly of the seat back, wherein the back board includes: a main wall region; and a pair of lateral wall regions extending from respective two lateral sides of the main wall region, such that an inward space is defined in the back board by the main wall region and the pair of lateral wall regions, the inward space being adapted for receiving the rear side of the seat back therein, wherein a first pressure receiving belt element is extended between the main wall region and one of the pair of lateral wall regions, whereas a second pressure receiving belt element is extended between the main wall region and another of the pair of lateral wall regions, wherein a first presser element is fixedly provided to the seat back framework so as to be in correspondence with the first pressure receiving belt element, whereas a second presser element is fixedly provided to the seat back framework so as to be in correspondence with the second pressure receiving belt element, and wherein the back board is securely attached over the rear side of the seat back, with the first and second pressure receiving belt elements being pressed and bent forcibly by the respective the first and second presser elements, thereby causing the afore-said pair of lateral wall regions of the back board to bend or curve toward each other in a direction inwardly of the back board, so that the pair of lateral wall regions are resiliently retained in a close contact with the respective the pair of lateral sides of the seat back.

Preferably, the back board may be formed from a thin synthetic resin material having an elastic property.

Preferably, each of the first and second pressure receiving belt elements may comprise a plurality of belt pieces disposed vertically in the inward space of the back board, and each of the first and second presser elements may comprise a wire element extending vertically along the seat back.

Other various features and advantages of the present invention will become apparent from reading of the description, hereinafter, with reference to the annexed drawings.

BRIEF DESCRIPTION OF THE DRAWINGS

FIG. 3 is a schematic exploded perspective view of principal parts of the present invention, which explanatorily shows how to connect the back bard to a seat back framework;

FIG. 4 is a front view of the back board, which shows the back board as having a plurality of belt pieces provided therein;

FIG. 5 is a diagram for explanatorily illustrating how the back board is attached to the seat back, with a presser wire element being moved toward one of the plurality of belt pieces; and FIG. 6 is a diagram for explanatorily illustrating how a lateral wall region of the back board is bent or curved to a close contact with a lateral side of the seat back, due to the presser wire element being a pressing contact with the belt piece.

DETAILED DESCRIPTION OF PREFERRED EMBODIMENT OF THE INVENTION

As shown in FIGS. 1 to 6, there is illustrated an exemplary preferred embodiment of a back board (1) for use with a seat back (SB) of automotive seat in accordance with the present invention.

Figure 1:
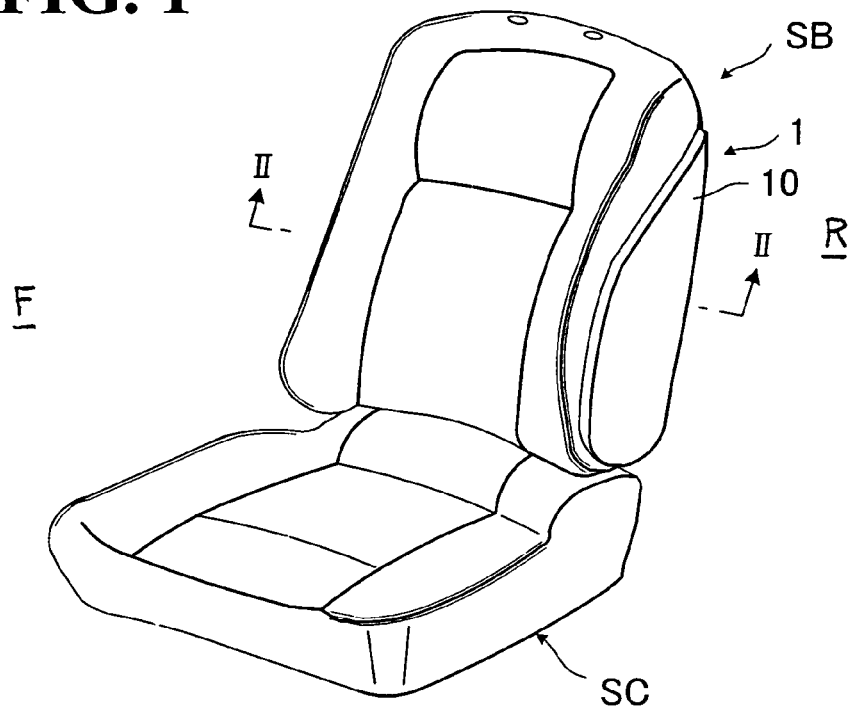
FIG. 1 is a schematic perspective view showing an automotive seat including a seat back and a back board securely attached to that seat back.

FIG. 1 shows, in perspective, an automotive seat comprising a seat cushion (SC) and the seat back (SB).

It is noted that the term, "forward" or "forwardly", refers to a side (F) forwardly of the seat back (SB) or the illustrative automotive seat, and the term, "rear", "rearward" or "rearwardly", refers to a side (R) rearwardly of the seat back (SB) or the illustrative automotive seat.

Figure 2:
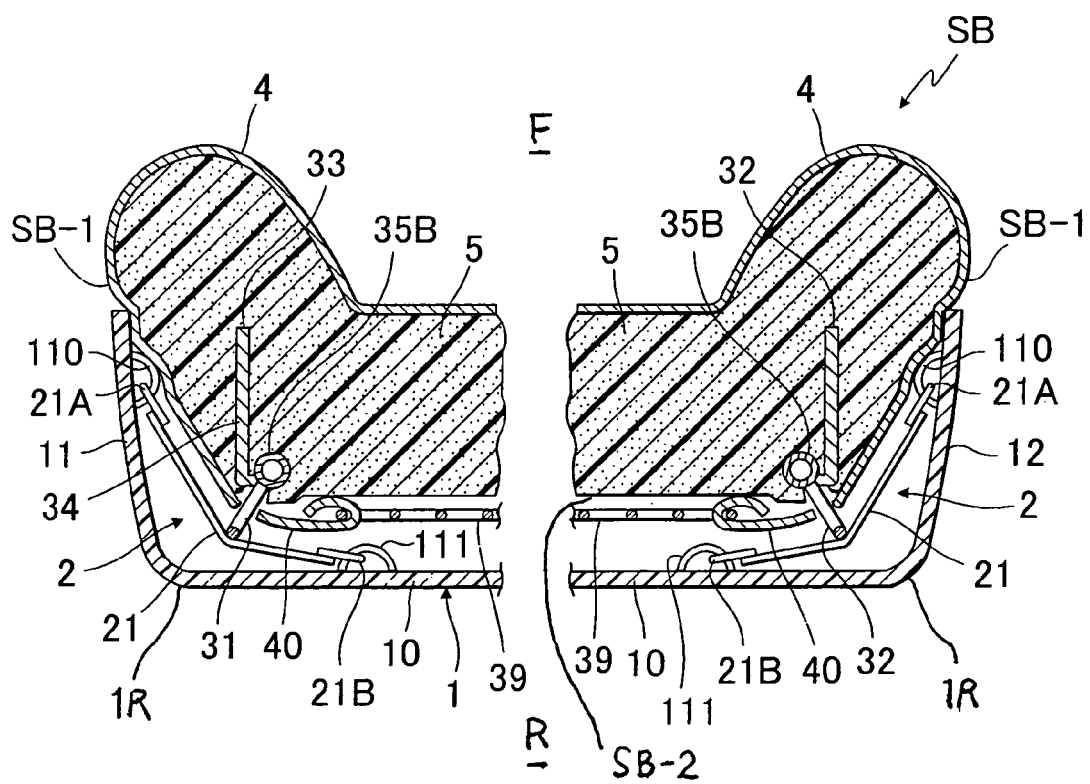
FIG. 2 is a sectional view taken along the line II-II in the FIG. 1.

The seat back (SB) is basically constructed by a seat back frame (BF) and an upholstery composed of a trim cover assembly (4) and a foam padding (5) which are formed integrally with the seat back frame (BF), wherein the foam padding (5) is disposed on the forward side of the seat back frame (BF) as understandable from FIGS. 2 and 3.

More specifically, the known seat back frame (BF) is typically composed of: a generally inverted-U-shaped upper tubular frame member (35) having an upper tubular frame section (35A) and a pair of vertically extending lateral tubular frame sections (35B) (35B) bent formed from the corresponding two end portions of that upper tubular frame section (35A); a pair of side plate frame members (33) (34); and a lower frame member (36) connected between the two lower regions respectively of the two side plate frame members (33) (34). The two lateral tubular frame sections (35B) (35B) are, at their respective free end portions thereof, fixedly connected with the two side plate frame members (33) (34), respectively.

Such seat back frame (BF) is integrally formed with a foam padding (5) and a trim cover assembly (4) through a proper foaming process into a predetermined shape of seat back (SB), as seen in FIG. 2, wherein it is seen that free end portions (40) of the trim cover assembly (4) covering the foam padding (5) are connected with a plurality of sinuous springs (39) at a rear side of the seat back (SB), so that the sinuous spring (39) are provided at the rearward surface (SB-3) of seat back (SB) as is known in the art.

In accordance with the present invention, with regard to the above-described conventional seat back frame (BF), briefly stated, a pair of first and second presser wire elements (31) (32), a connecting wire element (37) and a connecting lug (38) are provided to the rear side of that particular seat back frame (BF), as shown in FIG. 3, for purposes to be set forth later in combination with the back board (1).

As shown, the first presser wire element (31) is at one end thereof fixed to one of the afore-said two lateral tubular frame sections (35B) of seat back upper frame member (35), while being fixed at another end thereof to the lower area of the afore-said side plate frame member (33). Likewise, the second presser wire elements (31) (32) is at one end thereof fixed to another of the afore-said lateral tubular frame section (35B) of seat back upper frame member (35), while being fixed at another end thereof fixed to the lower area of the afore-said side plate frame member (34).

It is noted here that the first and second presser wire elements (31) (32) each extends rectilinearly and vertically in parallel with the rearward vertical side of the seat back frame (SB), while projecting such vertically extending recti near body in a direction rearwardly of the seat back frame (SB). Further, as seen in FIG. 2, the vertical rectilinear body of the first presser wire element (31) is inclined outwardly with respect to one lateral frame section (33) of seat back frame (BF), whereas likewise, the vertical rectilinear body of the second presser wire element (32) is inclined outwardly with respect to another lateral frame section (34) of seat back frame (BF). Thus, the first and second presser wire elements (31) (32) project in divergent fashion from the rearward surface (SB-3) of seat back (SB). Such outward inclination of each of the first and second presser wire elements (31) (32) is set by an appropriate angle such that, when attaching the back board (1) to the rear side of seat back (SB), the first and second presser wire elements (31) (32) at the seat back (SB) are to face toward the respective two corner portions (1R) (1R) of the back board (1) for purposes to be set forth later.

The connecting wire element (37) is extended between the two lateral tubular frame sections (35B) (35B) of seat back upper frame member (35) at a point above the foregoing first and second presser wire elements (31) (32).

The connecting lug (38) is fixedly attached to the lower frame member (36) of seat back frame (SB), as illustrated.

In accordance with the present invention, the back board (1) per se is formed from a thin synthetic resin material having an elastic property. It is noted that such "thin" synthetic resin material has a thin thickness which is small relative to a normal thickness of a back board of synthetic resin material with a view to reducing the weight of the back board (1) to attain a light weight of the seat back (SB), although numerical data on that thin thickness is not given herein. However, the back board (1) is not limited to such thin synthetic resin material, but any other suitable thin material may be used for forming the back board (1), insofar as it has an elasticity and a relatively small thickness or a small possible thickness which is effective in reducing a weight of the back board in order to attain a desired reduction of weight of the seat back (SB).

Specifically, as depicted in FIGS. 3 and 4, the illustrative back board (1) is formed in the illustrative three-dimensional configuration having a main wall region (10), a pair of lateral wall regions (11) (12), and a bottom wall region (13). The two lateral wall regions (11) (12) are bent or curved continuously from the respective two lateral ends of the main wall region (10) so as to extend in one direction by a predetermined angle of inclination. An inward, space of such three-dimensional back board (1), which is defined among those wall regions (11, 12 and 13), is substantially in conformity with and larger than a contour of the rear side of the seat back (SB), sufficient to receive that particular reward side of seat back (SB) therein. It is noted here that the rear side of seat back (SB) includes a rear surface (SB-2) of the seat back (SB) and also includes the two lateral surfaces (SB-1) and bottom surface (SB-3) of the seat back (SB), as far as the illustrative embodiment is concerned.

As best seen in FIGS. 4 and 5, each lateral wall region (11 or 12) is inclined outwardly from the main wall region (10) at a given angle. Hence, the two lateral wall regions (11) (12) extend divergent from that main wall region (19) in the forward direction.

Generically stated, the back board (1) is further provided with a pair of pressure receiver elements (2) (2) at the respective two corner portions (1R) (1R) thereof. Such pair of pressure receiver elements (2) (2) are to work in conjunction with the respective afore-said two presser wire elements (32) (32) to cause the two lateral wall regions (11) (12) of the back board (1) to resiliently bend or curve toward each other in a direction inwardly of that particular back board (1), as will be elaborated later.

Each of the pressure receiver elements (2) may comprise a plurality of belt pieces (21) which are securely provided in the corner portion (1R) of the back board (1) so as to extend slant between the main and lateral wall regions (10) of the back board (1).

More specifically, according to the shown embodiment, each of the belt pieces (21) has a pair of first and second hooked male engagement pieces (21A) (21B) fixed to the respective two freed ends thereof. As shown, the first hooked male engagement piece (21A) is engaged with a first female engagement piece (110) fixed on the inward surface of the lateral wall region (11) of back board (1), whereas on the other hand, the second hooked male engagement piece (21B) engaged with a second female engagement piece (111) fixed on the inward surface of the main wall region (10) of back board (1). Thus, each belt piece (21A) extends aslant in each corner portion (1R) of the back board (1).

Accordingly, as best depicted in FIG. 4, disposed vertically along one back board corner portion (1R) is one set of equidistant belt pieces (21) (or three equidistant belt pieces (21) in the shown embodiment), and, likewise, disposed vertically along another back board corner portion (1R) is another set of equidistant belt pieces (21) (or three equidistant belt pieces (21) in the shown embodiment) in such a manner that those two sets of belt pieces (21) extend divergently in a direction from the main wall region (10) to the respective two lateral wall regions (11) (12), of the back board (1)

Designation (10A) denotes a hooked engagement lug formed in the top region of the back board (1), which is adapted for engagement over the connecting wire member (37) of seat back frame (BF). Designation (13A) denotes a connecting hole formed in the bottom wall region (13) of back board (1), which is to be connected with the connecting lug (38).

As indicated by the one-dot chain lines and arrows in FIG. 3, the above-constructed back board (1) is securely attached to the reward side of the seat back (SB) by engaging the hooked engagement lug (10A) of back board (1) over the connecting wire member (37) of seat back (SB), while the bottom wall region (13) of back board (1) is securely connected with the connecting lug (38) of seat back (SB) by means of bolt and nut (not shown) being firmly connected together via the hole (13A).

At this moment, as understandable from FIG. 5 to FIG. 6 in conjunction with FIG. 2, the two presser wire elements (31) (32) are brought to contact with the aforementioned one and another set of belt pieces (21) (i.e. pressure receiver element (2)), respectively, and further pressed thereagainst, so that those one and another sets of belt pieces (21) are each bent in a generally "V" shape and forcibly displaced toward the back board main wall region (10) to a given point close to the corresponding back board corner portion (1R). Consequently, the two lateral regions (11) (12) of the back board (1) are resiliently bent or curved by the thus-pressed belt pieces (21A) toward each other relative to the respective two corner portions (1R) (1R) in a direction inwardly of the back board (1), and are eventually brought to close contact with the respective two lateral surfaces (SB-1) (SB-1) of the seat back (SB), as understandable from FIGS. 2 and 6.

Accordingly, it is appreciated in accordance with the present invention that:

(i) The back board (1) per se may be formed from a thin and elastic material, thereby reducing a weight of the back board (1) itself and thus allowing a whole weight of the seat back (SB) with that thin back board (1) to be reduced to a desired light amount, which leads to an effective fuel economy.

(ii) Due to the thin elastic back board (1), by simply securing the back board (1) to the rear side of seat back (SB), both two lateral wall regions (11) (12) of back board (1) are automatically bent or curved and brought to contact with the respective two lateral sides (SB-1) (SB-1) of seat back (SB). This effectively simplifies processes of assembling the seat back (SB) with the back board (1).

(iii) Further, those two lateral wall regions (11) (12) are biasingly retained in a close contact with the respective two lateral sides (SB-1) (SB-1) because of the plurality of belt pieces (21) are pressed rearwardly by the two presser wire element (31) (32) to prevent creation of clearances between the back broad (1) and seat back (SB), thereby keeping an outer appearance of the seat back (SB) in a good aesthetic condition.

(iv) Substantially a whole of the seat back rear side (SB-3) is retained distant from or out of contact with the back board (1) due to the interposition of the presser wire elements (31 and 32) and plurality of belt pieces (21) between the seat back rear side (SB-3) and back board (1). Hence, even when a load is applied from the seat back (SB) to the back board (1), the load is dispersed into the belt pieces (21) and weakened by a buffering effect of the belt pieces (21), with the result that the seat back (SB) is not pressed or not strongly pressed against the back board (1), and further, the load from the seat back (SB) is not exerted directly on the thin back board (1). Therefore, no additional reinforcing element is required for the thin back board (1), thus maintaining a light weight of the seat back (SB).

While having described the present invention so far, it should be understood that the invention is not limited to the illustrated embodiment, but any other modification, replacement and addition may be applied thereto without departing from the scopes of the appended claims.

What is claimed is:

1. A combination of a seat back of automotive seat and a back board, wherein said seat back has a rear side disposed rearwardly thereof and a pair of lateral sides, and also has a seat back framework and a foam padding, such that said foam padding is disposed at a side of said seat back framework which faces forwardly of the seat back;

wherein said back board has:

a main wall region having two lateral sides; and a pair of lateral wall regions;

wherein said pair of lateral wall regions extend divergent from the respective said two lateral sides of said main wall region so as to extend aslant in a direction outwardly of the latter, thus defining one obtuse-angled corner portion between said main wall region and one of said pair of lateral wall regions and another obtuse-angled corner portion between said main wall region and another of said pair of lateral wall regions;

wherein an inward space is defined in said back board by said main wall regions, said pair of lateral wall regions, and said one and another of said pair of lateral wall regions, said inward space being adapted for receiving said rear side of said seat back therein;

wherein a first pressure receiving belt element is provided in said one obtuse-angled corner portion to extend rectilinearly between said main wall region and said one of said pair of lateral wall regions, whereas a second pressure receiving belt element is provided in said another obtuse-angled corner portion so as to extend rectilinearly between said main wall region and said another of said pair of lateral wall regions;

wherein a first presser element is fixedly provided to said seat back framework in correspondence with said first pressure receiving belt element, whereas a second presser element is fixedly provided to said seat back framework in correspondence with said second pressure receiving belt element, and wherein said back board is securely attached over said rear side of seat back, with said first and second pressure receiving belt elements being pressed and bent forcibly by the respective said first and second presser elements in direction to the respective said one and another obtuse-angled corner portions, thereby causing said pair of lateral wall regions of the back board to bend or curve towards each other, so that the pair of lateral wall regions are resiliently retained in close contact with the respective said pair of lateral sides of said seat back, while said rear side seat back is securely received in said inward space of said back board.

2. The combination as claimed in claim 1, wherein said back board is formed from a thin synthetic resin material having an elastic property.

3. The combination as claimed in claim 1, wherein said first pressure receiving belt element comprises a plurality of first belt pieces arranged vertically alongside of said one obtuse-angled corner portion in said inward space of said back board; and wherein said second pressure receiving belt element comprises of a plurality of second belt pieces arranged vertically alongside of said another obtuse-angled corner portion in said inward space of said back board.

4. The combination as claimed in claim 1, wherein said first pressure receiving belt element comprises a plurality of first belt pieces arranged vertically alongside of said one obtuse-angled corner portion in said inward space of said back board;

wherein said second pressure receiving belt element comprises of a plurality of second belt pieces arranged vertically alongside of said another obtuse-angled corner portion in said inward space of said back board;

wherein said first presser element comprises a first wire element which extends in a direction along said one obtuse-angled corner portion of said back board, while being in a pressing contact with said plurality of first belt pieces; and wherein said presser element comprises a second wire element which extends in a direction along said another obtuse-angled corner portion of said back board, while being in a pressing contact with said plurality of second belt pieces.

* * * * *